July 3, 1934.  P. ROGLIANO  1,965,158
VENTILATING SYSTEM
Filed April 27, 1932  3 Sheets-Sheet 2

INVENTOR
Pasquale Rogliano
By W. W. Williamson
Atty.

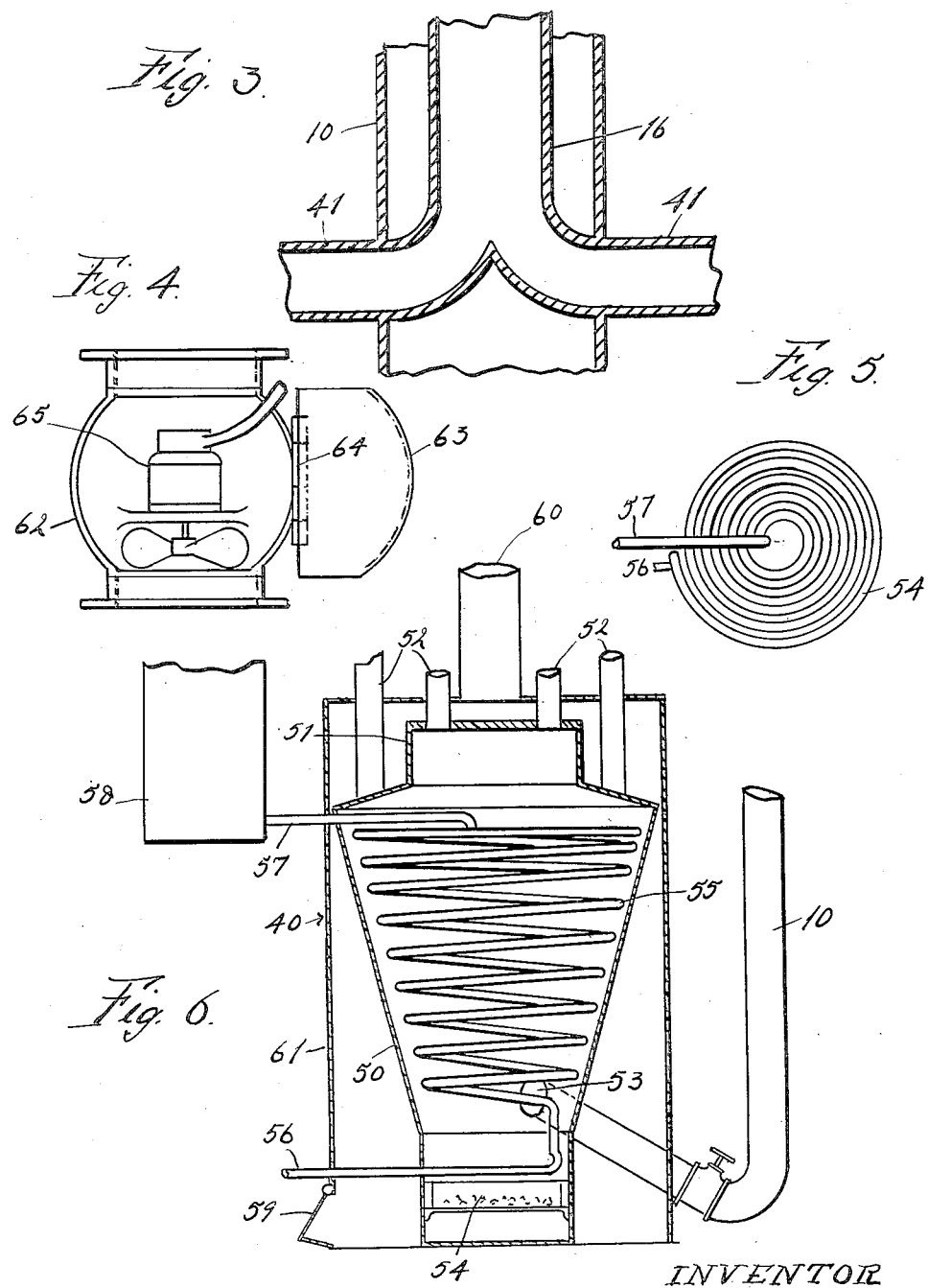

Patented July 3, 1934

1,965,158

UNITED STATES PATENT OFFICE 1,965,158

VENTILATING SYSTEM

Pasquale Rogliano, Philadelphia, Pa.

Application April 27, 1932, Serial No. 607,768

2 Claims. (Cl. 98—34)

My invention relates to new and useful improvements in ventilating systems and has for one of its objects to provide such a system by means of which the various rooms and spaces within a building may be thoroughly ventilated by forcing fresh air thereto and withdrawing foul air therefrom in such a manner as to either create a certain amount of air pressure within the building or a certain amount of rarefication of the air within the building.

A further object of the invention is to provide for heating the incoming air in cold weather.

A still further object of the invention is to provide mechanical means to utilize wind power to force fresh air within the building and to draw the foul air therefrom.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 3 is a fragmental section of the pipes for carrying air into the building and conveying it therefrom showing the branching of the out-take pipe.

Fig. 4 is a detail view of the casing and electric motor contained therein for creating air circulation when the wind power is not sufficient.

Fig. 5 is a detail plan view of the hot water coil.

Fig. 6 is a central vertical section of the heating apparatus showing the air pipes leading thereto and therefrom and also showing the heating coil for supplying hot water to a boiler.

Figure 1:
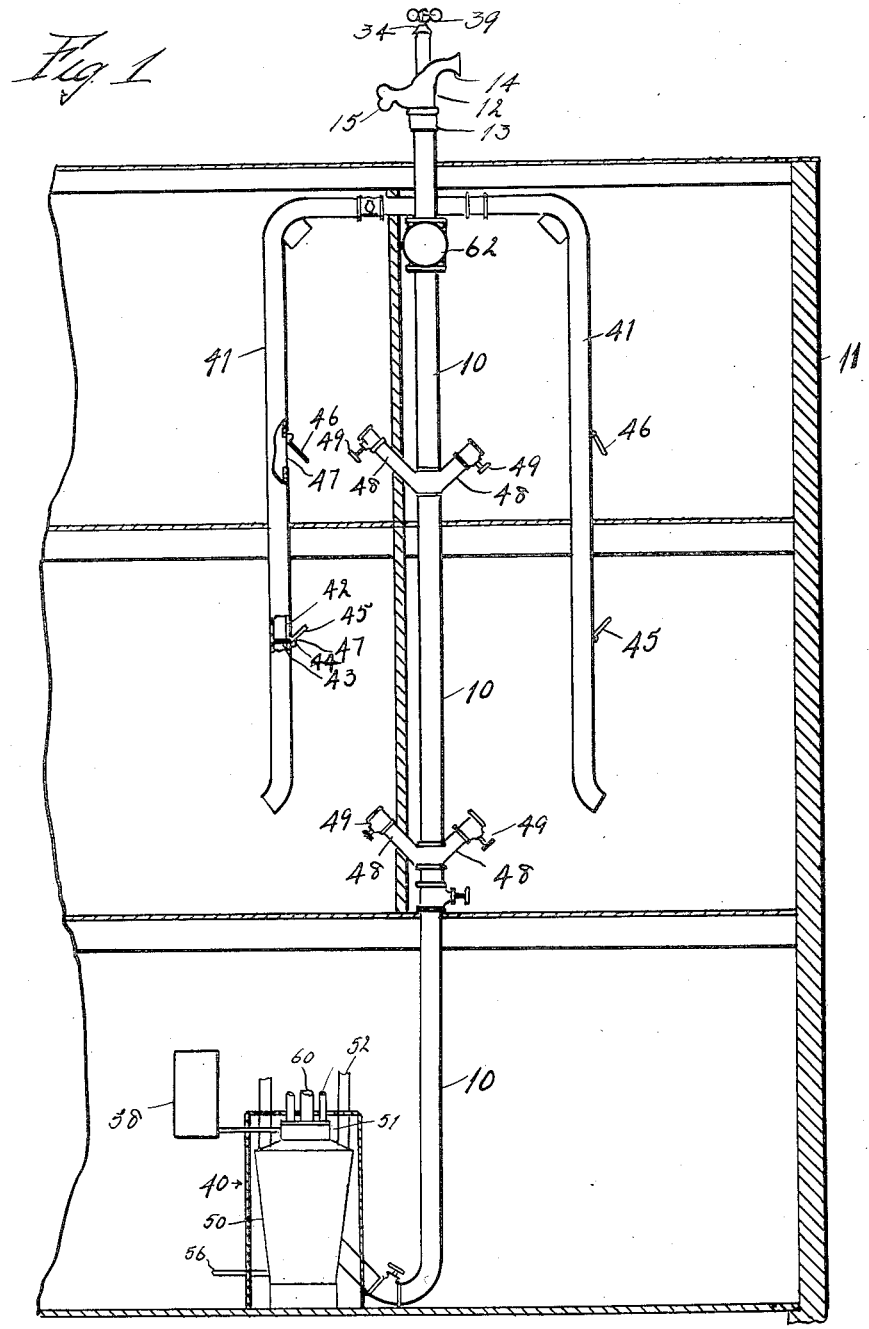
Fig. 1 shows a portion of a building in section and my improved ventilating system installed therein.
Figure 2:
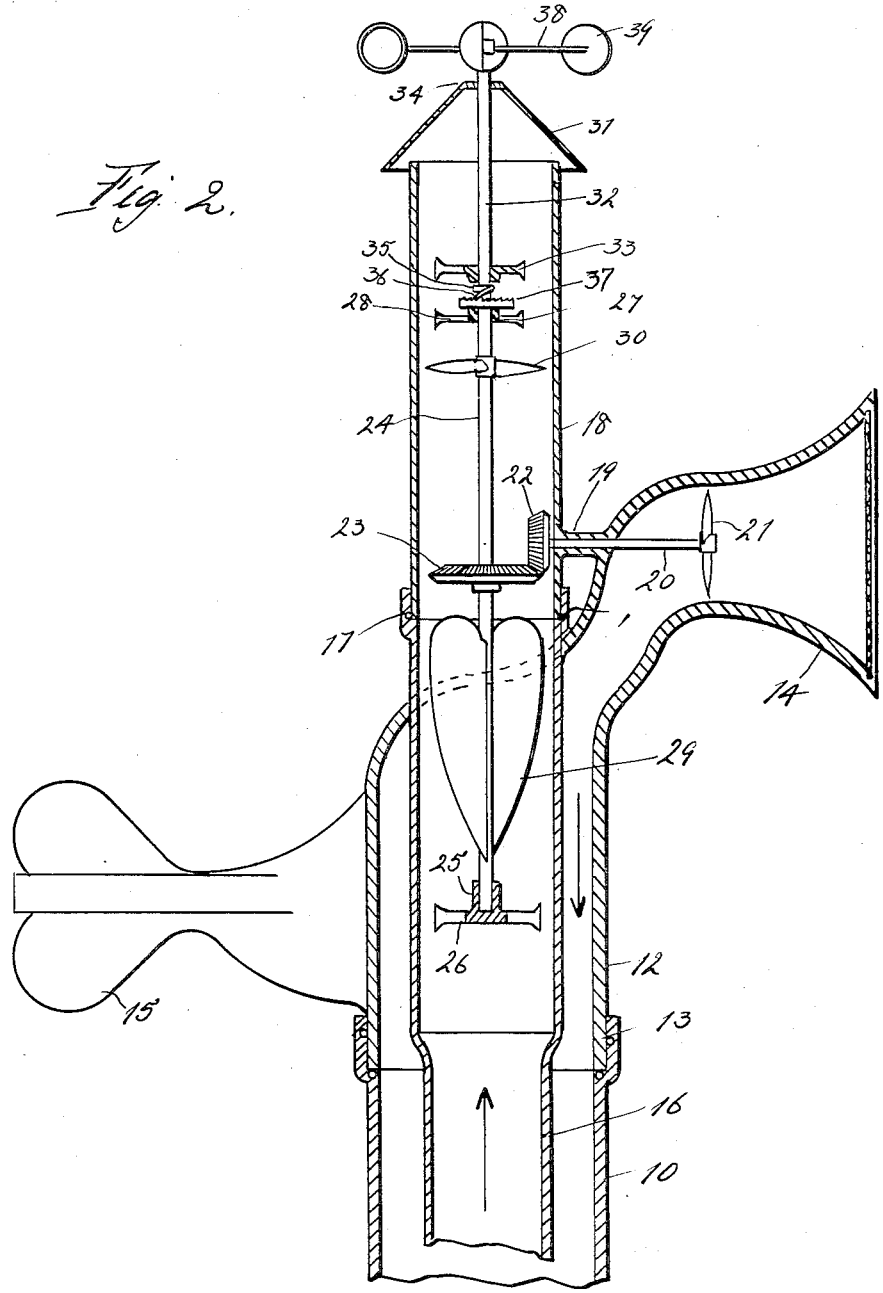
Fig. 2 is an enlarged vertical section of the apparatus for utilizing wind power to bring about the ventilation within a building.

In carrying out my invention as herein embodied, 10 represents the main pipe in my improved system for delivering fresh air into the interior of a building 11 and this pipe projects above the roof of the building and has mounted thereon the extension 12, the lower end of which may be seated in a series of ball bearings 13 so as to revolve upon the main pipe with as little friction as possible.

14 represents the funnel-shaped intake of the extension 12, and 15 is the vane for keeping said intake in the face of the wind after the manner of the ordinary weather vane.

16 represents an out-take pipe located within the intake pipe 10 and extending through the top of the extension 12 so that said extension revolves around this out-take pipe and has seated in the ball bearing 17 and outlet pipe or nozzle 18 to which latter the funnel 14 is rigidly connected by the bridge 19 so that the funnel and the nozzle revolve together.

20 represents a shaft which is journalled in the bridge 19 and has a wind wheel 21 of the propeller type secured on the outer end thereof, while upon the inner end of this shaft is mounted the bevel pinion 22 meshing with the bevel gear 23, the latter being secured upon the vertical shaft 24 so that when the wind wheel 21 is revolved by the wind blowing into and through the funnel, the shaft 24 will also be revolved but at half the speed of the shaft 20 since the pinion 22 is half the diameter of the gear 23.

The shaft 24 has its lower end mounted in a socket bearing 25 formed with the spider 26 which latter is secured to the walls of the upper portion of the pipe 16 and the upper end of this shaft is journalled within the bearing 27 formed with the spider 28, the latter being secured to the inner walls of the nozzle 18 and upon this shaft is secured the blower blades 29 and also the blower blades 30 so that when this shaft is revolved, air will be drawn upward through the pipe 16 and forced out of the upper end of the nozzle 18, the latter having a cap 31 mounted thereon in such manner as to permit this outflow of air while protecting the upper end of the pipe against the entrance of rain, snow, hail or other obstructing substances.

32 is an auxiliary shaft journalled in the bearing 33 and in the cap as at 34, and the lower end of said shaft carries a collar 35 to which is pivoted a pawl 36 for engagement with the teeth of the ratchet wheel 37. To the upper end of this shaft is secured the arms 38, the outer end of each arm carrying a wind cup 39, the action of which device is after the manner of an anemometer. This arrangement provides for utilizing the position of the wind turning the anemometer to assist in propelling the shaft 24 but permits the shaft 24 to revolve independent of the shaft 32 since the teeth of the ratchet will ride under the pawl when the shaft 24 is being revolved and the shaft 32 is standing still or revolving at less speed than the shaft 24 as will be readily understood.

From the above description it will be seen that the open end of the funnel is always kept in the wind concentrating that portion of the wind that enters said funnel upon the wind wheel 21 thereby causing the blowers 29 and 30 to revolve creating a suction within the out-take pipe 16 which serves to draw foul air from out of the building from which said pipe leads, while the wind flowing in the funnel will flow downward through the pipe 12 to the various outlets in the building hereinafter described.

The intake pipe 10 passes down through the building, the lower end thereof extending into the heater 40 for the purpose hereinafter set forth.

41 represents branch pipes leading from the out-take pipe 16 and these branch pipes extend downward into the various room and spaces in the building which are to be ventilated having their lower ends open for taking in air and also having openings 42 at various points and each of these openings is closed by a valve 43 which is pivoted at 44, having a handle 45 so that said valve may be swung to a vertical position to close its opening or to a horizontal position as shown in Fig. 1, to shut off the flow of air in said pipe below said valve, thereby permitting air to enter the pipe at the opening 42, this is for the purpose of taking the foul air from a room at two or more different levels. On the upper floors of the building the pipes 41 are provided with the shutters 46 to close the openings 47, it being understood that when these shutters are open air will enter the pipe at these points as well as through the openings 42 on the lower floors when the latter are open. The pipe 10 has the branches 48 leading therefrom on each floor and each of these pipes has a shut off valve 49 whereby the flow of air from this pipe in any particular room may be regulated.

The heater 40 consists of a housing 50 in the general form of an inverted cone having a dome 51 thereon from which latter lead the pipes 52 and these pipes are intended to lead to the various rooms of the building for delivering hot air to said rooms, the air delivered from the lower end of the pipe 10 to the housing as at 53 being heated by the fire 54.

55 represents a coil for heating water and this coil is located within the housing 50 and has a supply pipe 56 leading to the bottom thereof, and a take off pipe 57 leading from the upper end thereof to the boiler 58 so that while the air delivered from the pipe 10 is being heated, water may also be heated and stored in said boiler.

I prefer that the coil be wound in the general shape of an inverted cone, the upper portion of the pipe forming said cone to be also wound in a spiral as shown in Fig. 6, so as to expose a relatively large surface of said coil to the action of the heat from the fire 54.

59 is a hinge door for regulating the amount of air feed to the fire and 60 is a flue for carrying off any fumes. A casing 61 surrounds the housing and to this casing is hinged the door 59 and from this casing also leads the flue 60.

62 represents a casing coupled into the pipe 10, one half of which casing forms a door 63 hinged at 64 to the stationary portion of the casing and in this casing is positioned an electric blower 65 for adding to the force of air passing downward through the pipe 10 to accelerate the ventilation process or for carrying on this ventilating process should the force of the wind not be sufficient to drive the wind wheel 21, the door 63 giving free access to the motor for oiling, repairing or other purposes.

By the proper manipulation of the valves 43, the shutters 46 and the valves 49, the air within any or all of the rooms of a building may have the pressure thereon increased or diminished as for instance should the valve 49 in any given room be opened to its greatest extent and the valve 43 in the same room be partially or entirely closed, the tendency would be to deliver more air to the room than could escape therefrom, thus adding pressure to the air in this room. Whereas, should the valve 43 be opened to its full extent while the valve 49 was partially or entirely closed, the insucking of the air by the pipe 41 would tend to rarefy the air in the room by reducing the pressure thereon.

By constructing the above described apparatus and arranging this system as herein set forth, I am enabled to heat or cool a building while at all times giving the proper amount of ventilation and with little or no cost for bringing about the circulation, since the force of the wind outside of the building will usually supply the power necessary for this purpose.

Of course I do not wish to be limited to the exact details of constructions as herein shown, as these may be varied within the limits of the appended claims without departing from the spirit of my invention.

Having thus fully described my invention, what I claim as new and useful is:—

1. In a system of the character described, an intake pipe, an extension of said pipe mounted upon the upper end of the latter so as to revolve independently thereof, an intake funnel offset from said extension, a vane carried by the extension for maintaining the mouth of the funnel in the face of the wind by the action of the wind, an out-take pipe located within the intake pipe and the extension thereof and projecting through the top of said extension, a nozzle rigidly connected to the funnel and revolvably mounted upon the out-take pipe, a wind wheel positioned within the funnel so as to be revolved by air flowing through said funnel, a shaft upon which said wheel is secured, a pinion secured upon the opposite end of said shaft, a gear wheel with which said pinion meshes, a vertical shaft upon which said gear wheel is secured and a series of blower blades secured to the vertical shaft for causing an exhaust action within the out-take pipe by the revolving of the wind wheel.

2. In a system of the character described, an intake pipe, an extension of said pipe mounted upon the upper end of the latter so as to revolve independently thereof, an intake funnel offset from said extension, a vane carried by the extension for maintaining the mouth of the funnel in the face of the wind by the action of the wind, an out-take pipe located within the intake pipe and the extension thereof and projecting through the top of said extension, a nozzle rigidly connected to the funnel and revolvably mounted upon the out-take pipe, a wind wheel positioned within the funnel so as to be revolved by air flowing through said funnel, a shaft upon which said wheel is secured, a pinion secured upon the opposite end of said shaft, a gear wheel with which said pinion meshes, a vertical shaft upon which said gear wheel is secured, a series of blower blades secured to the vertical shaft for causing an exhaust action within the out-take pipe by the revolving of the wind wheel, a ratchet wheel secured to the upper end of the vertical shaft, an extension shaft mounted in alignment with the vertical shaft, a pawl carried by said extension shaft, said pawl adapted to engage the teeth of said ratchet, and anemometer cups carried by the upper end of the extension shaft.

PASQUALE ROGLIANO.